Patented Jan. 29, 1929.

1,700,116

UNITED STATES PATENT OFFICE.

KARL BLUMRICH, OF HOCHST-ON-THE-MAIN, GERMANY, ASSIGNOR TO I. G. FARBEN-INDUSTRIE AKTIENGESELLSCHAFT, OF FRANKFORT-ON-THE-MAIN, GERMANY.

MANUFACTURE OF CALCIUM NITRATE.

No Drawing. Application filed November 7, 1925, Serial No. 67,670, and in Germany November 11, 1924.

The object of my present invention is to manufacture calcium nitrate capable of being readily spread, which contains up to 17% of nitrogen and retains its capability of being spread for a considerable time Among the various artificial nitrogenous manures manufactured during the last years, calcium nitrate is distinguished by its particularly favorable effect on the soil due to its content of calcium. There has, for instance, been much used a calcium nitrate composed of one molecule of calcium nitrate to a little more than two molecules of water containing 13,3 per cent of nitrogen, but this manure has been supplanted by other nitrogenous manures, because, on the one hand, they contain a still greater percentage of nitrogen and, on the other hand, because their stability is great enough to store them unpacked and keep them for a long time in a state in which they can be spread; this is not the case with the aforementioned deliquescent calcium nitrate containing 13,3 per cent of nitrogen.

However the demand of the farmers for a calcium nitrate which is capable of being spread and contains as large an amount of nitrogen as possible has continuously been repeated.

Now I have found how to manufacture such a calcium nitrate. I conceived the idea to increase the nitrogen-content of the calcium nitrate by entirely or almost entirely freeing it from water, for calcium nitrate with little or no water contains up to 17 per cent of nitrogen, that is to say even more than the much used sodium nitrate.

However the general opinion was that the said procedure is not practicable owing to the deliquescence of this salt containing little or no water, because the anhydrous calcium nitrate is generally believed to possess stronger hygroscopic properties than its hydrate and consequently the possibility of using such anhydrous calcium nitrate was generally denied. As I have found this is not justified, because the practical usefulness of a salt does not depend on the intensity with which it absorbs water, but on the time it requires to become moist and deliquescent.

According to my present invention it is possible to keep calcium nitrate, which has entirely or almost entirely been deprived of water, in a state in which it is capable of being spread. For this purpose the calcium nitrate containing little or no water is mixed, after cooling it below the melting point of its hydrate, with some solid hydrate of calcium nitrate the quantity of which is optional and may be very small. I have found that when working in this manner the stream of calcined and subsequently cooled calcium nitrate thus obtained—if it is passed through some mixing apparatus—requires only a single treatment with solid calcium nitrate hydrate, because this hydrate, when thoroughly mixed, is continuously formed in sufficient quantity by the absorption of the traces of water still contained in the calcined product and thereby the "inoculation" propagated. The calcium nitrate thus obtained contains up to 17 per cent of nitrogen and retains much longer its capability of being spread than the hydrated commercial calcium nitrate. A test-portion of the calcium nitrate, for instance, treated according to our new process and exposed to an atmosphere of 75 per cent of relative moisture, lost its capability of being spread only after five days, whereas a comparative test-portion of a 75 per cent hydrated calcium nitrate became sticky and smeary already after 1½ days. Hence, dehydrated and untreated calcium nitrate is entirely unsuitable for being strewn for the reason that it becomes at once superficially smeary so much so that it sticks to the hands.

The following example illustrates my invention:

A solution of 75 per cent of calcium nitrate obtained by evaporating a thinner solution is completely dehydrated in a calcining apparatus and then cooled to 35° C. for instance by means of a cooling coil. In the cool portion of the said coil there is added to the quantities first fed into the apparatus some solid powdery hydrate of calcium nitrate. By the mixing effect of the coil this "inoculation" is imparted to the subsequent portions of the product. Thus a product with a content of nitrogen up to nearly 17 per cent is obtained which has lost its hydroscopic properties to a considerable extent.

I claim:

1. The process comprising intimately mixing calcium-nitrate preparations in a substantially dehydrated condition with solid powdery hydrate of calcium-nitrate at a temperature below the melting point of the hydrate.

2. The process comprising intimately mixing calcium-nitrate preparations in a substantially dehydrated condition with a small quantity of solid powdery hydrate of calcium-nitrate at a temperature below the melting point of the hydrate.

3. The process comprising substantially dehydrating calcium-nitrate preparations by heating, then cooling the dehydrated mass to a temperature below the melting point of the solid hydrate of calcium nitrate and finally intimately mixing solid powdery hydrate of calcium nitrate with the cooled mass.

4. The process consisting in substantially dehydrating calcium-nitrate preparations by heating, then cooling the dehydrated mass to a temperature below the melting point of the solid hydrate of calcium nitrate and finally intimately mixing a small quantity of solid powdery hydrate of calcium nitrate with the cooled mass.

5. The process consisting in substantially dehydrating calcium nitrate by heating, then cooling the dehydrated mass to a temperature of approximately 35° C., and finally intimately mixing solid powdery hydrate of calcium nitrate with the cooled mass.

6. The process consisting in substantially dehydrating calcium nitrate by heating, then cooling the dehydrated mass to a temperature of approximately 35° C., and finally intimately mixing a small quantity of solid powdery hydrate of calcium nitrate with the cooled mass.

7. As new products, calcium-nitrate preparations obtainable by intimately mixing calcium nitrate preparations in a substantially dehydrated condition with a small quantity of solid powdery hydrate of calcium nitrate at a temperature below melting point of the hydrate, said products having a nitrogen content up to 17% and being readily spreadable.

In testimony whereof, I affix my signature.

KARL BLUMRICH.